US006228920B1

(12) United States Patent
Topolkaraev et al.

(10) Patent No.: US 6,228,920 B1
(45) Date of Patent: May 8, 2001

(54) COMPOSITIONS AND PROCESS FOR MAKING WATER SOLUBLE POLYETHYLENE OXIDE FILMS WITH ENHANCED TOUGHNESS AND IMPROVED MELT RHEOLOGY AND TEAR RESISTANCE

(75) Inventors: Vasily Topolkaraev; James H. Wang, both of Appleton, WI (US)

(73) Assignee: Kimberly-Clark Woldwide, Inc., Neenah, WI (US)

( * ) Notice: Subject to any disclaimer, the term of this patent is extended or adjusted under 35 U.S.C. 154(b) by 0 days.

(21) Appl. No.: 09/113,778

(22) Filed: Jul. 10, 1998

(51) Int. Cl.$^7$ .............................. C08L 71/02; C08L 3/02; C08L 1/28; C08L 39/08; C08L 53/02

(52) U.S. Cl. ........................... 524/377; 524/378; 524/43; 524/47; 524/502; 524/503; 524/514; 524/515; 524/516; 524/517; 524/521; 524/522; 524/523; 524/524; 524/525; 524/575

(58) Field of Search .................................... 524/376, 377, 524/378, 501, 575, 43, 47, 502, 503, 504, 513, 514, 515, 516, 517, 521, 522, 523, 524, 525; 525/186; 523/206

(56) References Cited

U.S. PATENT DOCUMENTS

| | | | |
|---|---|---|---|
| Re. 25,880 | 10/1965 | Cline ..................... | 523/412 |
| Re. 30,754 | 9/1981 | Hammer et al. ...................... | 525/379 |
| 3,340,327 | 9/1967 | Spellberg ............................. | 525/445 |
| 3,830,762 | 8/1974 | Abbott ................................. | 524/52 |
| 3,867,324 | 2/1975 | Clendinning ......................... | 523/126 |
| 3,895,155 | 7/1975 | Shukuri ............................... | 428/206 |
| 3,996,181 * | 12/1976 | Hayashi et al. ...................... | 524/503 |
| 4,102,845 * | 7/1978 | Schröder et al. ..................... | 524/377 |
| 4,169,823 * | 10/1979 | Jones ................................... | 524/502 |
| 4,276,339 | 6/1981 | Stoveken .............................. | 428/153 |
| 4,511,687 | 4/1985 | Nakanishi ............................ | 524/270 |
| 4,554,181 | 11/1985 | Cousin et al. ........................ | 427/261 |
| 4,585,835 | 4/1986 | Saegusa ................................ | 525/430 |
| 4,592,954 | 6/1986 | Malhotra .............................. | 428/335 |
| 4,594,389 | 6/1986 | Lal ....................................... | 524/378 |
| 4,627,950 * | 12/1986 | Matsui et al. ........................ | 264/103 |
| 4,857,602 | 8/1989 | Casey ................................... | 525/408 |
| 4,865,914 | 9/1989 | Malhotra .............................. | 428/331 |
| 4,902,553 | 2/1990 | Hwang et al. ........................ | 428/156 |
| 5,075,153 | 12/1991 | Malhotra et al. ..................... | 428/207 |
| 5,216,050 | 6/1993 | Sinclair ................................ | 524/108 |
| 5,244,714 | 9/1993 | Malhotra et al. ..................... | 428/195 |
| 5,264,491 | 11/1993 | Quirk ................................... | 525/177 |
| 5,442,016 | 8/1995 | Jarrett .................................. | 525/415 |
| 5,476,909 | 12/1995 | Kim ..................................... | 525/408 |
| 5,514,380 | 5/1996 | Song ..................................... | 424/426 |
| 5,519,085 | 5/1996 | Ma ....................................... | 524/503 |
| 5,522,841 | 6/1996 | Roby ..................................... | 606/230 |
| 5,530,074 | 6/1996 | Jarrett .................................. | 525/415 |
| 5,589,545 | 12/1996 | Ramachandran ..................... | 525/184 |
| 5,618,911 | 4/1997 | Kimura ................................ | 528/361 |
| 5,641,502 | 6/1997 | Skalla ................................... | 424/426 |
| 5,670,448 | 9/1997 | Kometani ............................. | 503/227 |
| 5,672,424 | 9/1997 | Malhotra et al. ..................... | 428/325 |
| 5,683,793 | 11/1997 | Malhotra et al. ..................... | 428/216 |
| 5,709,976 | 1/1998 | Malhotra et al. ..................... | 430/124 |

FOREIGN PATENT DOCUMENTS

| | | |
|---|---|---|
| 0 203 817 | 12/1986 | (EP) . |
| 0 291 348 | 11/1988 | (EP) . |
| 0 534 235 | 3/1993 | (EP) . |
| 0 590 965 | 4/1994 | (EP) . |
| 0 687 689 | 12/1995 | (EP) . |
| 0 707 041 | 4/1996 | (EP) . |
| 0 792 916 | 9/1997 | (EP) . |
| 1 472 692 | 5/1977 | (GB) . |
| 67766 * | 4/1983 | (JP) ..................................... 524/501 |

OTHER PUBLICATIONS

International Search Report for PCT/US99/15396, filed July 8, 1999, Kimberly–Clark Worldwide, Inc.

"Standard Test Method for Tear–Propagation Resistance of Plastic Film and Thin Sheeting by a Single–Tear Method," ASTM D1938–94.

"Standard Test Method for Water Vapor Transmission of Materials," ASTM E 96–80.

Goodwin, J.W. et al., Synthesis, Characterization, and Rheology of Polymer–Stabilized Aqueous Suspensions of Polystyrene Latex, *Polymeric Materials Science & Eng., Proceedings of the ACS*, 61 156–160, 1989.

Oun, Ahmed Mohammed, Preparation and Characterization of Polymer Stabilized Polystyrene Latex, *Polymer International*, 29 313–318, 1992.

Liang, W. et al., Use of Water Soluble Polymers for the Control of Rheology of Latex Dispersions, *Polm mater sci eng proc acs div polym mater sci eng*, 66 75–76, 1992.

Tucker, P.S. et al., Molecular Weight Effects on Phase Behavior of Blends of Poly(phenylene oxide) with Styrenic Triblock Copolymers, *Macromolecules*, 21 2794–2800, 1988.

Baker, James A. et al., Investigation of the Adsorption Configuration of Poly(ethylene oxide) and Its Copolymers with Poly(propylene oxide) on Model Polystyrene Latex Dispersions, *Langmuir*, 4 1055–1061, 1988.

(List continued on next page.)

*Primary Examiner*—Peter Szekely
(74) *Attorney, Agent, or Firm*—Kilpatrick Stockton, LLP (57) ABSTRACT

The invention relates to blends of a polyethylene oxide (PEO) resin and a latex emulsion. The blends are formed by mixing or coating a PEO powder resin with a latex emulsion and melt blending the powder. The blends have improved processibility and toughness which are beneficial in the manufacture of PEO-based films and fibers. The films composed of the PEO/latex blend have improved toughness, breathability, and tear resistance and are useful for the manufacture of disposable, flushable medical and personal care products, such as diapers, tampons, feminine napkins, and bladder control pads.

17 Claims, 4 Drawing Sheets

OTHER PUBLICATIONS

Jeon, Characterization of Poly(Carboxylic Acid)/Poly(Ethylene Oxide) Blends Formed Through Hydrogen Bonding by Spectroscopic and Calorimetric Analyses, *Journal of Polymer Science: Part A: Polymer Chemistry*, 26 1419–1428, 1988.

Chern, C.-S. et al., Emulsion Polymerization of Acrylic Monomers Stabilized by Poly(Ethylene Oxide), *J.M.S.—Pure Appl. Chem.*, A33 1063–1075 (8), 1996.

Liang, W. et al., Effect of Volume Fraction and Particle Size on Depletion Flocculation of a Sterically Stabilized Latex Dispersion Induced by Addition of Poly(ethylene oxide), *J. Colloid Interf. Sci.*, 155 156–164, 1993.

Lindstrom, T. et al., Network Flocculation and Fractionation of Latex Particles by Means of Polyethyleneoxide—Phenolformaldehyde Resin Complex, *J Colloid Interf Sci*, 97(1) 62–67, 1984.

Deng, Yulin et al., Synthesis of Nonionic Flocculants by Gamma Irradiation of Mixtures of Polyacrylamide and Poly(ethylene oxide), *J. Applied Polymer Science*, 54 805–813, 1994.

Heath, David et al., Rheological Investigations of the Effect of Addition of Free Polymer to Concentrated Sterically Stabilised Polystyrene Latex Dispersions, *Faraday Discuss. Chem. Soc.*, 76 203–218, 1983.

Krupers, Complexation of Poly(Ethylene Oxide) With Poly-(Acrylic Acid–Co–Hydroxyethyl Methacrylate)s, *Eur. Polym. Journal*, 32(6) 785–790, 1996.

Bromley, C.W.A., The Preparation of Sterically Stabilised Aqueous Latices Using Polyethylene Oxide, *Colloids and Surfaces*, 17 1–11, 1986.

* cited by examiner

FIG_1

FIG. 4

COMPOSITIONS AND PROCESS FOR MAKING WATER SOLUBLE POLYETHYLENE OXIDE FILMS WITH ENHANCED TOUGHNESS AND IMPROVED MELT RHEOLOGY AND TEAR RESISTANCE

FIELD OF THE INVENTION

The present invention relates generally to polymeric films, processes for their manufacture, and their use in flushable medical and personal care products. More specifically, the invention relates to the modification and processing of polyethylene oxide (PEO) resins to make films for the production of such flushable products which have the advantages of improved toughness, softness, and tear resistance.

BACKGROUND OF THE INVENTION

Disposable personal care products, such as pantiliners, diapers, and tampons, are a great convenience, as are disposable medical care products, such as drapes, gowns, head coverings, and face masks. These products provide the benefit and convenience of one time, sanitary use. However, disposal of many of these products is a concern due to limited landfill space. Incineration of such products is not desirable because of increasing concerns about air quality and because of the costs and difficulty associated with separating these products from other disposed articles that cannot be incinerated. Consequently, there is a need for disposable products which may be quickly and conveniently disposed of without dumping or incineration.

It has been proposed to dispose of such products in municipal and private sewage systems. Ideally, the products would be degradable in conventional sewage systems. Products suited for disposal in sewage systems which can be flushed down conventional toilets and are dispersed or disintegrated in water are termed "flushable." Disposal in this manner is simple, convenient, and sanitary.

Personal care and medical care products must have sufficient strength to maintain integrity under the environmental conditions in which they will be used. They must also be able to withstand the elevated temperature and humidity conditions encountered during use and storage and still lose integrity upon contact with water in the toilet. Therefore, a water-disintegrable material which is capable of thermal processing into a thin film having mechanical integrity is desirable.

Currently, thin films are typically made from water-insoluble polymers or polymer blends. Frequently used polymers include amorphous polymers, epoxy resins, and semicrystalline polymers. Examples of amorphous polymers are polystyrene (PS), styrene-acrylonitrile copolymers, polycarbonate, and poly(vinyl chloride) (PVC). Examples of semicrystalline polymers are polyethylene (PE), polyamide (PA), polybutadiene (PB), and polypropylene (PP). The most commonly used polymers are polypropylene, and polyethylene.

The thin films composed of these polymers are formed by extrusion casting or melt blowing processes. Conventional film extrusion involves mixing commercially available pellets of the desired polymers at increased temperatures, followed by extruding the mixture in a single screw extruder through a slit die to form a film. The film is then cooled by passing it through a series of chilled rolls. Films made in this manner from such water-insoluble polymers are unsuitable for use in "flushable" personal care and medical care products because they do not possess the desired characteristics, e.g., they will not degrade in conventional sewage systems and consequently form blockage in the sewer lines.

Polyethylene oxide (hereinafter PEO) is a hydrophilic, water-soluble polymer, that is produced from the ring opening polymerization of ethylene oxide, It is available in widely varying molecular weights in the form of a powder from a number of sources, for example, Union Carbide Corp. (Danbury, Conn.) PEO is currently used as a flocculant to enhance the deposition of colloidal particles onto wood pulp fiber in the paper-making process. It is also used as an additive to modify such properties as the aggregation state, sedimentation behavior, and rheology of polymers employed as paints and adhesives. PEO is also used to modify and stabilize polymer lattices, for example, by grafting PEO chains to a polystyrene lattice.

Due to its unique interaction with water and body fluids, the present inventors are considering it as a component material for flushable and personal care products. However, currently available PEO resins are not practical for the formation of thin films by melt extrusion or for personal care product applications for a number of reasons.

For example, while low molecular weight PEO resins have desirable melt viscosity and melt pressure properties for extrusion processing, they have low melt strength and low melt elasticity which limit their ability to be drawn into films having a thickness of less than about 2 mil. Films produced from low molecular weight PEO also have low tensile strength, low ductility, and are too brittle for commercial use.

High molecular weight PEO resins, on the other hand, should produce films having improved mechanical properties compared to those produced from low molecular weight PEO. High molecular weight PEO, however, has poor processibility and poor melt drawability due to its high melt viscosity. Melt pressure and melt temperature must be significantly elevated during melt extrusion of high molecular weight PEO, resulting in PEO degradation and severe melt fracture. Therefore, only very thick films of about 7 mil or greater in thickness can be made from high molecular weight PEO. Films this thick are not practical for flushable applications.

Attempts to melt extrude PEO often result in severe degradation of the PEO. Even when a film can be formed, the PEO undergoes morphological changes such as crystallization and aging, when it is cooled from the melt and exposed to the ambient environment. These changes affect the mechanical properties of the film, resulting in a film that is weak and brittle, having very low elongation-at-break and tear resistance, and, thus, not suitable for the production of personal care products. What is needed in the art, therefore, is a means to overcome the difficulties in melt processing of PEO resins and to improve the resultant ductility and toughness of the thin films formed therefrom.

It is known in the art to modify water-insoluble polymer resins, such as polystyrene and polypropylene, by incorporating soft rubber particles into the polymeric structure to improve the toughness of the polymer, to reduce its modulus, and to improve the softness and flexibility of the resulting material. The modifier can be a rubber-like elastomer, a core-shell modifier, or another polymer, such as styrene butadiene polymers and acrylic polymers. Incorporation of the modifier can significantly reduce the elastic modulus of the polymer under tension. It can also initiate energy dissipation processes in the polymeric structure during deformation resulting in increased elongation at break, enhanced toughness, and improved tear resistance. The efficiency of the modifier depends upon the specific base polymer/modifier composition, blend morphology, phase structure, and toughening mechanisms and process conditions.

The modifier can be incorporated into the base polymer by several different processes. One such process is conventional melt blending methods. These methods involve the blending of a base polymer blend with thermoplastic elastomers or particulate rubbers. The highly dispersive and distributive mixing required is generally achieved with twin screw extruders or with high shear mixers under high temperature and high shear conditions. Another such process is to mix liquid rubber with a monomer of the desired base polymer followed by polymerization of the mixture under conditions that result in a controlled rubber-phase separation.

There are two types of base polymer/modifier systems which can be formed: a dispersed system and a network system. In a dispersed system, the base polymer is a matrix throughout which the modifier particles are dispersed. In a network system, the base polymer is present in the form of particles or islands which are surrounded by thin elastomer layers of the modifier to form a honeycomb-like network. Both types of systems exhibit very fine, well-dispersed morphologies.

Dispersed systems typically exhibit two toughening mechanisms which provide additional energy absorption in the polymer under tension. One mechanism is the preferred formation of crazes at the rubber particles, i.e., stress bearing microcracks with the stretched polymer fibrils. This type of energy absorption is observed in high-impact polystyrene and many grades of acrylonitrile-butadiene-styrene (ABS) polymers. Another mechanism is shear deformation between the modifier particles, i.e., multiple shearing. This type of energy absorption is observed in impact-modified polyamide and polypropylene.

Network or honeycomb systems exhibit a third mechanism of energy absorption in addition to the two mechanisms exhibited by dispersed systems. In this third mechanism there is an intensive yielding of the thermoplastic particles inside the meshes of the network, i.e., multiple particle yielding.

PEO cannot be efficiently modified by the prior art methods described above. It is difficult to melt process PEO under the conditions required to incorporate the rubbery modifiers of the prior art into the PEO matrix because PEO is very sensitive to high shear and high temperature. Attempts to modify PEO in this manner result in poor thermal stability and high shear-induced degradation. Additionally, conventional melt blend extruders employ a series of water baths to cool the resulting polymer strands. Because PEO is water-soluble and water-absorbing, the strands cannot be cooled in this manner.

Polymerization of the PEO monomer/modifier mixture would require the development of expensive and complex steps. Control of the morphology of the resulting blend would be significantly limited, and the success of such a process is unpredictable.

Thus, there is a need in the art for disposable medical and personal care products that will maintain strength and integrity during use and will degrade in conventional sewage systems. Further, there is a need in the art for a process of modifying PEO to improve its melt processibility and mechanical properties.

Additionally, there is a need in the art for tougher, softer, and more tear resistant PEO. There is also a need for a PEO resin having improved melt processing properties. Further, there is a need in the art for a PEO resin which is useful for the production of flushable films, dispersible thin-films, and flushable breathable films.

SUMMARY OF THE INVENTION

Stated generally, the present invention comprises water-dispersible compositions for use in flushable medical and personal care products having improved toughness and tear resistance. More particularly, the present invention comprises, in one aspect, blends comprising PEO and latex which provide improved processing and solid state properties when compared with conventional PEO. The blends of the invention comprising PEO and latex possess a unique microstructure which provides a number of advantageous properties when compared to PEO alone. Additionally, the water present in the latex forms a molecular association with the PEO in the blend, acting as a plasticizer for the PEO.

In a second aspect, the present invention comprises processes for modifying PEO, by forming a blend comprising PEO and latex, to improve melt processing and physical properties. The process includes mixing or coating PEO powder or pellets with a latex emulsion. The amount of emulsion added can vary greatly. Generally, about 60 weight percent or less of the emulsion based on the blend is added to the PEO. The mixture is then melt processed, for example, by extrusion with a twin screw extruder fitted with a strand die. The strands of the blend are collected on a fan-cooled conveyor belt and cut into pellets.

In another aspect, the present invention comprises PEO-based films produced from the blend. These films can be produced, for example, by compression molding or extrusion casting. These films have improved mechanical properties, such as tensile strength and tear resistance. The films also exhibit reduced modulus and improved softness, toughness, and ductility. Due to these improved mechanical properties, the films of the invention can be produced at thicknesses significantly less than those formed with PEO alone. For example, the films of the invention can have thicknesses of about 1 mil to about 4 mil. They can be used to thermally process articles which have improved properties, such as toughness and dispersibility, over articles similarly processed from PEO alone. Such items include, but are not limited to, fabrics, garments and articles, such as drapes, towels, covers, overwraps, gowns, head coverings, face masks, shoe coverings, CSR wraps, sponges, dressings, tapes, underpads, diapers, liners, wash cloths, sheets, pillow covers, napkins, clothlike outercovers, feminine tampons, pads and pantiliners, baffle films, and any woven, nonwoven, or otherwise formed materials. Such products can be employed in the medical industry, both in hospitals and outpatient facilities, and in home environments.

Accordingly, it is an object of the invention to modify commercially available PEO resins in order to improve the melt-processibility of the PEO.

It is another object of the invention to modify PEO in order to thermally process the PEO into components of useful articles without adversely affecting the PEO and the properties of the finished article.

It is yet another object of the invention to modify PEO in order to thermoform articles having improved mechanical properties over prior art thermoformed articles comprising conventional PEO.

Another object of the invention is to provide a process for modifying PEO which is fast, economical, and efficient.

Another object of the invention is to blends comprising PEO and latex with improved flexibility, toughness, and tear resistance.

Yet another object of the invention is to provide blends comprising PEO and latex having a unique microstructure of a nanoscale dispersion of fine latex particles in the lamellae structural assembly of the PEO resin.

It is a further object of the invention to provide a water-dispersible blends comprising PEO and latex having a more uniform fine crystalline morphology than conventional PEO.

Another object of the invention is to provide PEO-based films with improved elasticity, toughness, and tear resistance.

It is yet another object of invention to provide PEO-based films having improved melt rheology over conventional PEO films.

More generally, the present invention provides for blends comprising an emulsion and a polymer or mixture of polymers which are water-soluble and/or water-dispersible and films made from these blends. Accordingly it is an object of the present invention to modify water-soluble and water-dispersible polymers in order to improve their melt-processibility.

It is another object of the invention to modify water-soluble and/or water-dispersible polymers in order to thermally process the polymers into components of useful articles without adversely affecting the polymers and the properties of the finished article.

It is yet another object of the invention to modify water-soluble and/or water-dispersible polymers in order to thermoform articles having improved mechanical properties over prior art thermoformed articles.

Another object of the invention is to provide a process for modifying water-soluble and/or water-dispersible polymers which is fast, economical, and efficient.

Another object of the invention is to provide blends comprising an emulsion and a polymer or mixture of polymers which are water-soluble and/or water-dispersible which have improved flexibility, toughness, and tear resistance.

Yet another object of the invention is to provide blends comprising an emulsion and a polymer or mixture of polymers which are water-soluble and/or water-dispersible having a unique microstructure of a dispersion of fine particles in the structural assembly of the polymer.

It is a further object of the invention to provide blends comprising an emulsion and a polymer or mixture of polymers which are water-soluble and/or water-dispersible having a more uniform fine crystalline morphology than the conventional water-soluble and water-dispersible polymers.

Another object of the invention is to provide films made from blends comprising an emulsion and a polymer or mixture of polymers which are water-soluble and/or water-dispersible that have improved ductility, toughness, and tear resistance.

It is yet another object of invention to provide films made from blends comprising an emulsion and a polymer or mixture of polymers which are water-soluble and/or water-dispersible having improved melt rheology over conventional films.

These and other objects of the invention are achieved by forming blends comprising an emulsion and a polymer or mixture of polymers which are water-soluble and/or water-dispersible which are processible into films that are useful in the manufacture of disposable personal care products. More particularly, these and other objects of the invention are achieved by blends comprising PEO and latex which are processible into PEO-based films that are useful in the manufacture of disposable personal care products.

DETAILED DESCRIPTION OF THE PREFERRED EMBODIMENTS

In order to overcome the problems in the art associated with forming polymer films composed of water-soluble or water-dispersible polymers, the present inventors have developed a process for modifying polymers, such as PEO, with an emulsion, such as a latex emulsion. The resulting blends possess improved processing properties and produce films having superior properties to those produced from the water-soluble or water-dispersible polymer alone.

The particular embodiments of the present invention will be described in terms of the preferred blend comprising PEO and latex. However, it should be understood that any water-soluble or water-dispersible polymer and any emulsion as defined herein may be employed in the invention in a similar manner and that the resulting polymer/emulsion blends will have similarly advantageous properties over the polymers alone.

Figure 2:
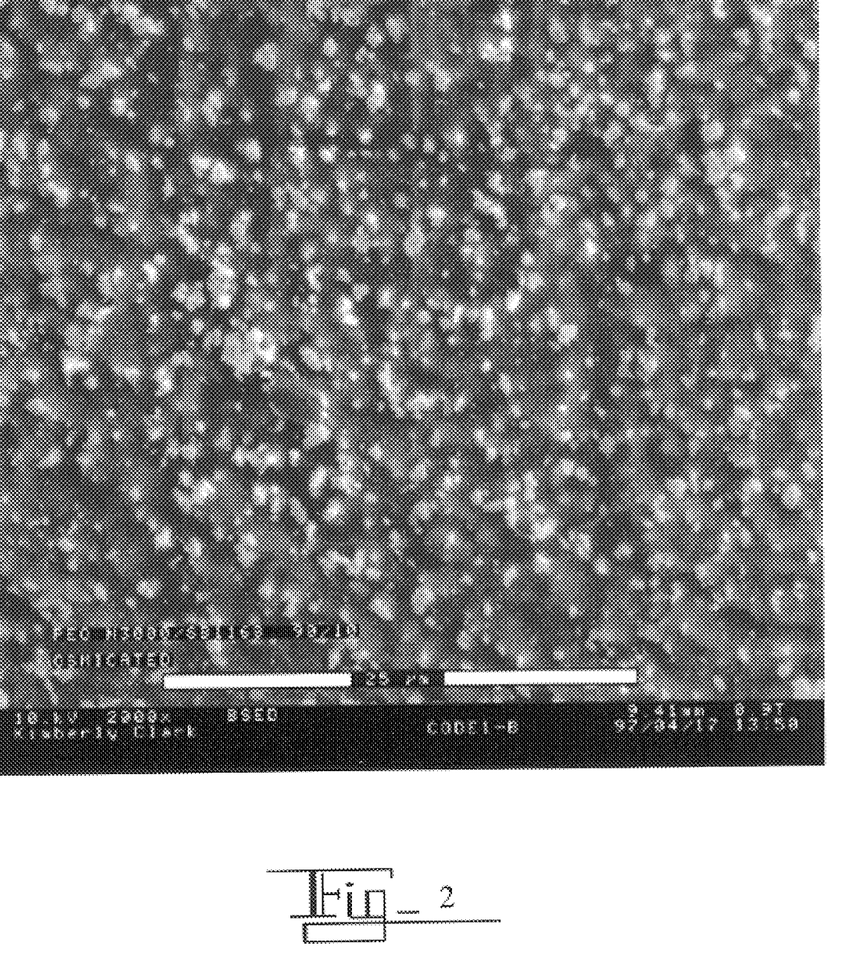
FIG. 2 is a scanning electron micrograph which illustrates the approximately uniform dispersion of the latex particles in the PEO resin.
Figure 3:
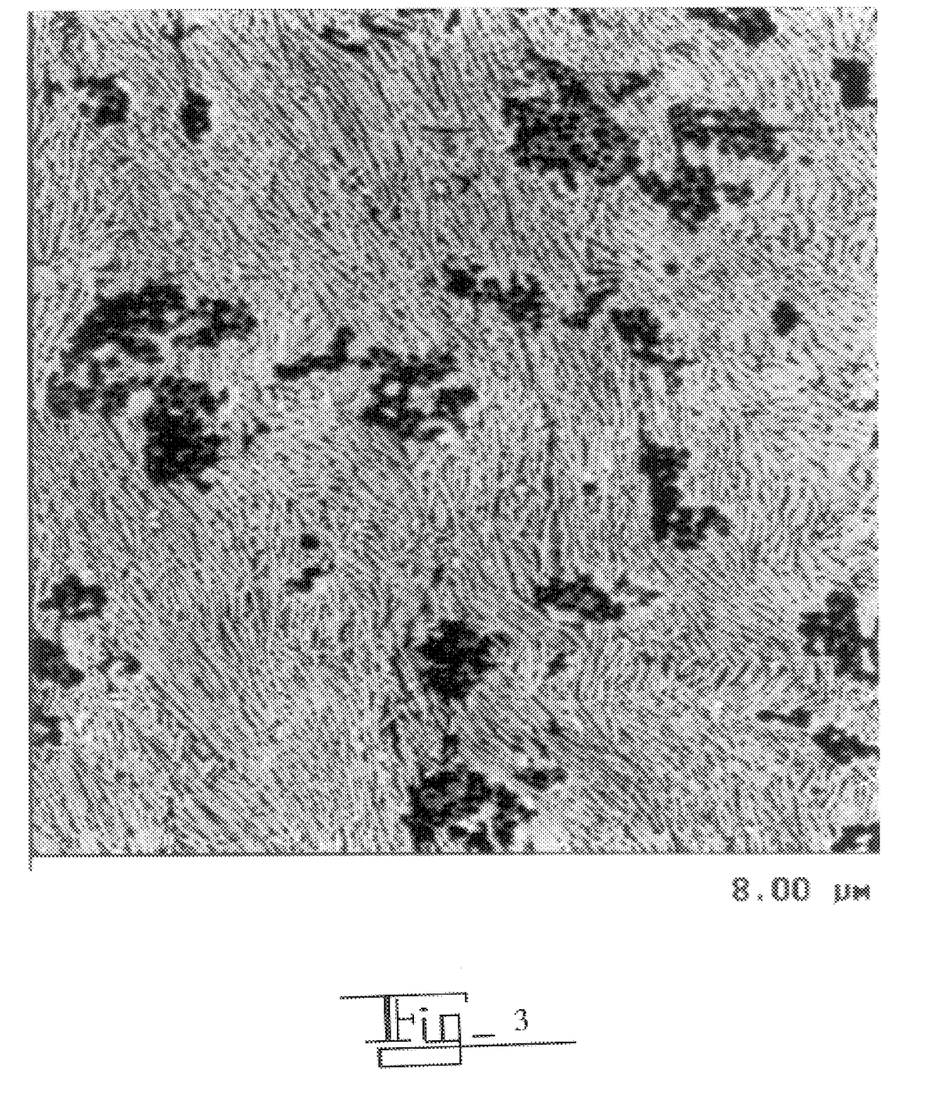
FIG. 3 is an atomic force micrograph demonstrating the unique microstructure of a nanoscale dispersion of fine latex particles in the PEO resin.

The blend of the invention comprising PEO and latex has a unique microstructure which can be observed by scanning electron microscopy and atomic force microscopy. The PEO resin of the blend possesses a lamellae structural assembly in which there is an approximately uniform nanoscale dispersion of fine latex particles. In the blend, both individual latex particles, approximately 100 nm to 200 nm in diameter, and clusters of the particles, approximately a few microns in size, are embedded in the PEO lamellae structural assembly. Atomic force microscopy illustrates the unique microstructure of a nanoscale dispersion of fine latex particles in the lamellae structure of the PEO resin. Some of the particles form clusters. The particles in the clusters are not tightly packed and do not appear to be coupled. (See FIG. 3) Scanning electron microscopy illustrates the approximately uniform dispersion of the latex particles in the PEO resin. (See FIG. 2)

Analysis of thermal properties using Differential Scanning Calorimetry (DSC) demonstrates that the blend can exhibit an increased crystallinity over PEO alone. This increase may be due to enhanced molecular mobility of the PEO chains in the presence of the emulsion as well as additional nucleation sites provided by the rubber.

The DSC data also indicate that water of the emulsion is structurally bonded with the PEO because water-melting transition does not occur during the cooling/heating cycle. The bound water functions as a plasticizing agent for the PEO, improving its processing and solid state properties.

The blend comprising PEO and latex also exhibits a lower melt viscosity, as determined by capillary rheometer, than PEO alone. For example, blends having a 70/30 ratio of PEO/latex have demonstrated a 30% reduction in melt viscosity. This reduction in viscosity is exhibited over a broad range of shear rates and provides for improved processing of the blend over conventional PEO. It allows the blend to be processed at lower temperatures, reducing PEO degradation. Lower processing temperatures provide a reduced temperature gradient during melt cooling which allows for a higher processing rate.

Any polymer resin that is water-soluble, water-dispersible, or both which can form association compounds with water may be used in the invention. The invention also contemplates the use of mixtures or more than one of such polymers. Nonlimiting examples of such polymer resins are hydroxypropyl cellulose, polyvinyl alcohol, polyethyloxazoline, polyvinyl pyrrolidone, polyvinyl pyridine, gelatinized starch, nylon copolymers, polyacrylic acid, polyesters or mixtures thereof. The preferred polymer resin is polyethylene oxide (PEO). The selection of PEO as the preferred resin for the invention is based upon PEO's water solubility and melt processability. The selection is also based upon the availability of PEO resins in a wide range of molecular weights.

PEO and other such polymers useful in the present invention have very distinct properties from the water-insoluble polymers used in the prior art. These polymers form a molecular association with water. For example, water molecules form specific hydrogen bonded complexes with the ether oxygens of the PEO chain. This association affects the local motion of the polymeric chain to provide a plasticization effect. Additionally, the formation of PEO-water complexes results in the formation of a distinct state of the water in the PEO matrix. The bound water does not exhibit a detectable phase transition over the range of temperatures normally associated with bulk water. In other words, the bound water does not freeze or boil. This allows the use of water-based emulsions, having finally dispersed latex particles of controlled morphology and size, to modify the PEO or other polymer.

The water-insoluble polymers of the prior art cannot be modified by the methods of the instant invention because they do not have the ability to form a molecular association with water. Therefore, the water present in the emulsions of the present invention would exists as "free" water rather than "bound" water in any composition formed between the water-insoluble polymers of the prior art and the emulsions used in the present invention. Such free water would undergo phase transitions during melt processing, resulting in microscopic holes and weak spots in the film. Films produced from such polymer/emulsion compositions would have reduced tensile strength and reduced fracture resistance, the very problems solved by the present invention.

The PEO resins useful in the practice of this invention can be of any molecular weight. Preferred PEO resins have an average molecular weight ranging from about 100,000 g/mol to about 8,000,000 g/mol. High molecular weight PEO resins are desirable for enhanced liquid stability, mechanical strength, and ductility, while low molecular weight resins provide better melt flow and film-forming properties. Based upon these considerations, especially preferred PEO resins of the invention have a molecular weight between 200,000 g/mol and 4,000,000 g/mol.

Such PEO resins are commercially available. For example, PEO resins are available from Union Carbide Corporation (Danbury, Conn.) under the trade designations Polyox® WSR N-80 (MW=200,000), WSR N-750 (MW= 300,000), WSR N-3000 (MW=400,000), and WSR 205 (MW=600,000). Other PEO resins available from Union Carbide Corporation within the above average molecular weight range are sold under the trade designations WSR-3333, WSR-N-12K, WSR-N-60K, WSR-301, WSR Coagulant, WSR-303.

The emulsions useful in the practice of the present invention may be any organic polymer emulsion or any inorganic particulate dispersion and/or suspension. These emulsions can provide a number of different modifying properties, such as softness, ductility, toughness, and tear resistance, to the PEO.

There are basically two types of organic polymer emulsions, polybutadiene and acrylic-based polymers. Each type can be synthesized through emulsion polymerization techniques which are known in the art. The particle size of the rubber (latex) particles in the emulsions can be controlled during polymerization. For the present invention, an average particle size of about 10 nanometers to a few microns is preferred. The emulsions can also be produced in a variety of particle morphologies, such as rubbery-spherical, rubbery-core/glassy-shell, and multilayered. The morphology can be tailored to provide modifier particles with controlled compliance and surface properties.

Organic polymer emulsions useful in the present invention include, but are not limited to, styrene butadiene polymers, acrylics, styrene acrylics, polyvinyl acetate, acrylonitrile-butadiene-styrene, acrylonitrile, and acrylonitrile butadiene. Especially preferred polymer emulsions are styrene butadiene GOOD-RITE® 1168 latex and acrylonitrile-butadiene-styrene HYCAR® latex, each available from BF GOODRICH® Company having offices in Cleveland, Ohio.

In particular, inorganic particulate dispersions and/or suspensions useful in the invention include, but are not limited to, stabilized silica gel dispersions, nanoscale spherical silica dispersions, and dispersions of swellable clays. The invention is not limited to these compounds but includes any organic or inorganic particulate emulsion/stable dispersion in the form of discrete particulates in a stabilizing fluid.

The amount of emulsion may be varied based upon the particular polymer to be modified, the particular modifier chosen, and the particular properties to be enhanced. For example, modifiers for low molecular weight PEO may be selected and used in amounts that improve mechanical properties, such as softness, tensile strength, and ductility. Similarly, modifiers for high molecular weight PEO may be selected and used in amounts that lower melt viscosity and improve drawability. In general, the percentage of emulsion employed is from about 10 to about 60 weight percent of the blend, preferably about 10 to about 50 weight percent, more preferably about 15 to about 35 weight percent of the blend.

Two other parameters which affect the properties of the blend are the diameter of the individual particles (particle size) in the blend and the distance between the particles (interparticle distance) within the blend. These two parameters are interdependent. Their relationship can be defined by the following relation:

$$A = D((\pi/6V_p)^{1/3} - 1)$$

where A is the interparticle distance of the particles within the blend, D is the particle size of the particles in the blend, and $V_p$ the particle volume fraction in the blend, i.e., the concentration of particles. For the present invention, the particles should generally comprise about 3% to about 30% by weight of the polymer weight, preferably about 5 wt. % to about 25 wt. %, more preferably about 8 wt. % to about 20 wt. %. The average particle size of the particles in the blend should be from about 10 nanometers to about 20 microns, preferably about 50 nanometers to about 10 microns, more preferably about 100 nanometers to about 5 microns.

The water content of the emulsion is important in making films with improved fracture resistance. As noted above, PEO and other water-soluble polymers are capable of forming hydrogen bonded complexes with water. This bound water does not exhibit phase transitions. However, the amount of water which may be bound in such complexes is limited in PEO by the number of ether oxygen atoms in the polymer chain. Additional water will remain in the blend as free water. Free water exhibits phase transitions. These phase transitions can result in microscopic fractures which weaken the blend, resulting in films which are more brittle and possess a lower tensile strength. For the present invention, the water content of the emulsion is such to produce a blend having about 30 wt. % or less water, preferably about 20 wt. % or less, more preferably about 15 wt. % or less of water.

Additional additives may optionally be included in the blend to provide additionally advantageous properties. Nonlimiting examples of such additives include plasticizers, such as Tween® 20, colorants, pigments, antiblocking agents, antistatic agents, slip agents, de-tackifiers, and antioxidants, for example, Irganox® 1076, Irganox® 5057, and Irganox® 1135, and combinations thereof.

The blends of the present invention may be produced generally by mixing a water-soluble and/or water-dispersible polymer, or a mixture of such polymers with the emulsion and extruding the mixture. Several embodiments of the process are described, employing PEO resin as the polymer and latex emulsions as the emulsion. However, the process may be carried out in an analogous manner employing any water-soluble or water-dispersible polymer and any emulsion as defined herein.

PEO resin is commercially available only in powder form. However, the present inventors have developed a method for producing PEO pellets through extrusion, followed by cooling the PEO strands on a fan cooled conveyor belt. Thus, the present invention encompasses the use of both PEO powder and PEO pellets.

In one embodiment the process of producing the PEO/latex blend of the invention comprises two stages. In the first stage, the latex emulsion is mixed with PEO or is coated onto PEO powder or pellets. At this stage, water from the emulsion is absorbed into the PEO, providing plasticized PEO resin with predispersed rubbery particles on the surface of the PEO powder or pellets—a plasticized mixture of PEO and latex.

In the second stage of the process, the plasticized mixture of PEO and latex is fed into a twin screw extruder or high shear mixer to provide melt blending of the PEO and rubber particles.

In another embodiment, the process comprises a single step. When practiced as a single step, the PEO powder or pellets and the latex emulsion are either added together directly into the feed section of the extruder, or the PEO is added to the feed section of the extruder, and the latex emulsion is added further downstream. Due to the challenges of feeding a large amount of viscous latex into the extruder, it is preferable to perform the invention in two stages.

The PEO can be mixed or coated with the latex emulsion by any means, for example with a Brabender Plasticorder, a roll mill, or a ribbon blender. Advantageously, the PEO pellets are mixed with the latex emulsion using conventional tumbling techniques or a ribbon blender. A preferred method for coating PEO powder with the latex emulsion is with a high air pressure spray gun while the powder is mixing in a ribbon blender.

The device used to form the PEO/latex blend should be designed to provide high shear melt processing, sufficient residence time for mixing of the PEO and latex emulsion, and a potential for high rate processing. Such devices include high shear mixers, single screw extruders, and twin screw extruders, with twin screw extruders being preferred. Nonlimiting examples of twin screw extruders to provide a high melt shear and increased residence time are the Haake TW-100 twin screw and the Werner & Pfleiderer ZSK-30 twin screw extruder. Such an extruder has a feed section, one or more heated extrusion zones, and a strand die. The polymer strands produced are collected on a fan cooled conveyor belt. The feed section of the extruder is cooled by water to prevent premature melting of the PEO resin. The temperature in each of the heated zones may be the same or different and is separately controlled. The number of zones can be varied depending upon the molecular weight of the PEO and the number and type of latex emulsions employed. The strand die used to create the polymer strands that will be cut into pellets optimally has holes of about 3 millimeter in diameter to provide sufficient surface area for cooling.

The general temperature range for the blending process is from the $T_m$ (melting temperature) of the PEO employed to the decomposition temperature of the PEO. This temperature range is generally from about 75° C. to about 250° C. The preferred temperature range is from about 85° C. to about 220° C., more preferably about 100° C. to about 200° C. Temperatures in excess of 250° C. will result in excessive thermal degradation of the components. Higher initial temperatures are required to produce the blend from PEO powder than from the PEO pellets due to greater difficulty in melting the powder.

Shear rate is important in forming a uniform blend. The shear rate will depend upon the particular components employed and the desired properties of the final blend. For example, high molecular weight PEO requires greater shear for blending than does low molecular weight PEO. Blending of PEO powder requires higher shear rates than blending of PEO pellets. In general, a screw speed of between about 30 rpm and about 1200 rpm will produce an adequate shear rate.

The blend of the present invention can be fabricated into films or sheets by any conventional method, for example compression molding, extrusion casting, or melt blowing. In a preferred embodiment, the blend is extruded using a Haake twin screw extruder having a 4 inch slit die. The resulting film is collected on a chilled wind-up roll. The blend is extruded at temperatures between about 80° C. and about 150° C., preferably about 100° C. and 125° C., and the chilled wind-up roll is maintained at a temperature between about 15° C. and about 20° C.

The thickness of the film produced can be adjusted by varying the die gap, screw speed, and wind-up speed. Optimally, these parameters are adjusted to produce a film having a thickness between about 1 mil and about 4 mil.

The present invention also encompasses films made from the blend. These films exhibit improved combination of mechanical properties; such as reduced modulus, enhanced flexibility, softness, ductility, elongation-at-break, tensile strength, and tear resistance; and desired levels of breathability. These improvements in tensile behavior are a result of the unique morphology of the blend.

Tensile properties include Young's modulus, tensile stress-at-break, deformation energy-at-break, and elongation (% strain)-at-break. Tensile properties can be measured, for example, with a Sintech tensile tester (SINT CH 1/D) using Testworks 3.03 software (MTS System Co., Cary, N.C.). The films of the present invention were evaluated in both the machine direction (MD) and the transverse direction (TD). The machine direction is the direction along which the film is moved during manufacturing or processing. The transverse direction lies perpendicular to the machine direction and generally along the plane of the film.

Films made from the blend exhibit a decrease in modulus, especially at a latex emulsion loading of 25 weight percent or more. This decreased modulus results in increased flexibility and softness.

Films comprising the blends of the invention also exhibit increased elongation-at-break and generally exhibit increased tensile strength when compared to films made from conventional PEO. The increase of these properties contributes to the significant increase in the specific energy required to break the films compared with that required to break films formed from conventional PEO.

In a dry state, films made from the polymers of the present invention can have a tensile strength in the machine direction (MD) of between approximately 3 Mega-Pascal (MPa) and approximately 150 MPa. Preferably, the tensile strength of the film in the machine direction is between approximately 8 MPa and approximately 100 MPa, with improved performance and processibilty during subsequent manufacturing operations achieved at tensile strengths of approximately 50 MPa or less. The dry tensile strength of the film in the transverse direction (TD) is between approximately 3 MPa and approximately 150 MPa, preferably between approximately 6 MPa and approximately 100 MPa, with the most preferred range not greater than 50 MPa.

The percent elongation-at-break of the film can be determined by the following formula:

$$1000(L_f-L_i)/L_i$$

where $L_f$ is the final length of a film sample at the break and $L_i$ is the initial length of the film sample prior to elongation. The films of the present invention have an elongation-at-break in the machine direction of between about 30% and about 1500%, preferably between about 80% and about 1000%, more preferably between about 150% and about 1000%. The films exhibit an elongation-at-break in the transverse direction of between about 30% and about 1500%, preferably between about 50% and about 1000%, more preferably between about 100% and about 1000%.

The tear resistance of the films of the invention was measured by the ASTM D 1938-94 test method and reported as maximum load and total energy. Each of these factors were evaluated in both the machine and transverse directions of the film. The maximum load for tear propagation was normalized to the cross-section of the film in the direction of the tear to minimize a film thickness effect. The films comprising the blend of PEO and latex were able to withstand a significantly higher maximum load than film made from PEO alone.

The total energy of the tear was normalized to the volume of a section of the uncut film to take into account the thickness of the film. This allows for an accurate comparison between films having different thicknesses. The films of the present invention exhibit a dramatic increase in energy absorption during tear propagation as compared with plain PEO films.

Breathability of the films can be determined by measuring the water vapor transmission rate (WVTR). The water vapor transmission rate for the films can be calculated using athe ASTM Standard E96-80 method described in Example 11.

Films comprising the blends of the invention also exhibit improved breathability over films made from conventional water-insoluble polymers. Breathability is an important property in personal care products made from films because it allows the product to dry during use, reducing moisture against the skin. Thus, increased breathability of the film reduces skin breakdown, redness, irritation, and infection associated with retained moisture.

Conventional films made from water-insoluble polymers have very low water vapor transmission rates and, thus, decreased breathability. This problem is overcome in the prior art by the addition of fillers followed by stretching of the film to produce pores which provide breathability to the ultimate product. One type of filler which is used in the prior art calcium carbonate. The overall breathability of such products as measured by water vapor transmission rate varies widely from about 500 $g/m^2/24$ hr/mil (grams per square meter, per 24 hours, per 0.001 inch of film thickness) to about 5000 $g/m^2/24$ hr/mil, depending upon the filler employed, the amount of filler employed, and the amount by which the film is stretched. In general, the films of the present invention provide enhanced water vapor transmission rates of between approximately 300 $g/m^2/24$ hr/mil and approximately 20,000 $g/m^2/24$ hr/mil, preferably between about 800 $g/m^2/24$ hr/mil and about 7,000 $g/m^2/24$ hr/mil. Most preferably, the films of the present invention exhibit a water vapor transmission rate of about 1700 $g/m^2/24$ hr/mil to about 1800 $g/m^2/24$ hr/mil without stretching and without the formation of pores. Breathability in the films of the present invention is a result of the higher water vapor transmission rate of PEO.

These superior properties make the films of the invention well suited for use in disposable, flushable medical and personal care products. Such products include, but are not limited to, drapes, towels, covers, overwraps, gowns, head coverings, face masks, shoe coverings, CSR wraps, sponges, dressings, tapes, underpads, diapers, liners, wash cloths, sheets, pillow covers, napkins, clothlike outercovers, feminine tampons, pads and pantiliners, baffle films, and any woven, nonwoven, or otherwise formed materials. These materials can be employed in the medical industry, both in hospitals and outpatient facilities, and in the home environment.

For the production of such products, the films of the invention can be subjected to a selected plurality of stretching operations, such as uniaxial or biaxial stretching. Stretching operations can provide the film with enhanced softness, improved tactile properties, enhanced breathability, and reduced thickness. The film can also be post-treated to improve film properties by annealing the film at elevated temperatures; by spraying the film with a surface-active fluid to impart water or moisture repellent properties to the film; or by modifying the physical state of the film with ultraviolet radiation, an ultrasonic treatment, or high energy radiation treatment. In addition, the post-treatment of the film may incorporate a selected combination of two or more of the foregoing techniques.

Additionally, the films of the present invention can be coextruded or coated with a thin barrier layer, such as a resin, to provide a water or moisture barrier layer. The barrier layer can constitute about 3 to 20% of the overall gauge of the film. Examples of resins which can be utilized for such barrier layers include, but are not limited to, polycaprolactone, ethylene acrylic acid copolymers, polybutylene succinate, such as Bionolle® and Kraton® resins.

For applications in personal care products, the films of the invention can be embossed or otherwise provided with a matte finish to exhibit a more aesthetically pleasing apperance. The films can also be optionally be laminated with a nonwoven fabric. Examples of suitable fibers for the nonwoven fabric include, but are not limited to, organic fibers, such as cellulosic fibers, and synthetic fibers made from thermoplastic polymers, such as polyester, polyamide, and polypropylene. The nonwoven fabric can be optionally coated or treated to impart a desired level of liquid and/or vapor/moisture impermeability.

This invention is further illustrated by the following examples, which are not to be construed in any way as imposing limitations upon the scope thereof. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

EXAMPLES

Example 1

(Comparative)

175 parts POLYOX® WSR N-3000 polyethylene oxide (PEO) resin in powder form (Union Carbide Corp.) were mixed with 24 parts of plasticizer, Tween® 20 (ICI Americas Inc.), and 1 part antioxidant, Irganox® 1076 (Ciba Specialty Chemicals Corporation), and blended and pelletized using a twin screw extruder and an air cooled belt at Planet Polymer (San Diego, Calif.). To produce a film from this blend, the pellets were fed into a lab-scale Haake TW-100 twin screw extruder to which a 4-inch slit die was attached. The temperatures for the four heat zones in the extruder were 100° C., 100° C., 110° C., and 125° C. A wind-up roll, maintained at 15–20° C., was used to cast the film. A control film containing 87.5% PEO N3000, 12% plasticizer and 0.5% antioxidant (by weight) was produced which had a thickness of about 3 mil. The tensile and tear properties of this film are provided in Table 1. During tear testing, this film experienced Failure by Tear in the machine direction and a Tensile Failure in the transverse direction.

Example 2

The pellets of PEO with a plasticizer and an antioxidant were produced as in Example 1. 90 parts of these pellets were mixed with 10 parts of a Good Rite® SB 1168 (BF Goodrich) styrene butadiene (SB) emulsion (total solids-52 wt %), using a conventional tumbling technique. This produced pellets which were coated with emulsion and somewhat agglomerated. The pellets were then fed into the Haake twin screw extruder described in Example 1. Due to the small L/D ratio of the lab-scale Haake extruder, the compound was extruded twice to improve rubber dispersion. The extruder barrel temperatures were 80° C., 80° C., 85° C., and 87° C. for the first run and 110° C., 110° C., 120° C., and 120° C. for the second run. The screw speed was 60 rpm. Some evaporation of volatiles was observed during extrusion. The melt strands were cooled by air on a conveyer belt and pelletized. A smooth, uniform, and soft extrudate was obtained after the second extrusion. The pellets of this PEO/SB emulsion blend were cast into a film using the procedure described in Example 1. This film had a thickness of about 1.5 mil and SB emulsion content of about 10% by weight. The tensile and tear properties of the film of this example can be found in Table 1. During tear testing, this film experienced Tensile Failure in both the machine and transverse directions.

Example 3

The blend of this example was produced by the procedure of Example 2, except that 70 parts of the PEO pellets of Example 1 were blended with 30 parts Good Rite® SB 1168 styrene butadiene emulsion. A film was produced from this blend following the procedure of Example 1. The film had a thickness of about 3 mil and SB emulsion content of about 30% by weight. The tensile and tear properties of this film are provided in Table 1. During tear testing, this film experienced Failure by Tear in the machine direction and Tensile Failure in the transverse direction.

Example 4

The blend of this example was produced by the procedure of Example 2, except that 50 parts of the PEO pellets from Example 1 were blended with 50 parts of Good Rite® SB 1168 styrene butadiene emulsion. It was apparent from excess evaporation during blending that a large amount of free water was present in this formulation. As a result, the melt strands of this blend were porous and uneven. A film was produced from this blend following the procedure of Example 1. The film had a thickness of about 13 mil and SB emulsion content of about 50%. The tensile and tear properties of this film are provided in Table 1. During tear testing, this film experienced Failure by Tear in the machine direction and Tensile Failure in the transverse direction.

The tensile properties of the toughened PEO films of the present invention were determined using the strip-testing configuration of a Sintech tensile tester (SINTECH 1/D) and Testworks 3.03 software (MTS System Co., Cary, N.C. The testing was conducted with a 25 pound (110 N) load cell, and air-actuated, rubber-coated 3 inch (7.6 cm) grips. The film testing was conducted with a 1 inch (2.54 cm) gauge length and a 5 inch/min (12.7 cm/min) crosshead speed. An individual dog-bone type film sample was loaded perpendicular to and in the center of the grips, and is held in place when air pressure closes the grips together. The thickness of the film was input by the user before beginning the tensile testing. In each sample, the film was stretched until breakage occurred. The software was then used to create a stress-versus-strain plot and calculate the desired mechanical properties for the sample.

The deformation energy at break per unit volume of material was determined by the area under stress-strain curve divided on a product of cross sectional area of the film and a gauge length. To obtain the desired average tensile properties, five film specimens were cut in both machine and transverse directions (MD & TD) and tested for individual blend composition.

Tear properties of the films were measured by standard tear propagation for determining the tear resistance of plastic film and thin sheeting by a single-tear method (ASTM D 1938-94). The maximum load for tear propagation was measured and normalized by the cross sectional area of the film to take into account a film-thickness effect. The total energy to tear was normalized by the volume of the uncut portion of the test-film strip. In some cases, failure occurred as a result of a tensile stretching of the test-film specimen rather than as a result of tearing the specimen. This failure was designated as a tensile failure rather than failure by tear.

To obtain the desired average tear resistance properties, five film specimens were cut in both machine and transverse directions (MD & TD) and tested for individual blend composition.

TABLE 1

|  | Units | Ex. #1 | Ex. #2 | Ex. #3 | Ex. #4 |
|---|---|---|---|---|---|
| Tear Test Results |  |  |  |  |  |
| Maximum Load | g/sq. mm |  |  |  |  |
| MD |  | 160 | 350 | 200 | 150 |
| TD |  | 340 | 240 | 250 | 130 |
| Energy to Peak Load | MJ/cu. M |  |  |  |  |
| MD |  | 2 | 5 | 3 | 3 |
| TD |  | 4 | 2 | 2 | 2 |
| Total Energy | MJ/cu. M |  |  |  |  |
| MD |  | 3 | 20 | 3.5 | 5.5 |
| TD |  | 10 | 8 | 4 | 3.5 |
| Tensile Test Results |  |  |  |  |  |
| Tensile Strength | Mpa |  |  |  |  |
| MD |  | 8 | 7.5 | 6 | 3 |
| TD |  | 6.5 | 6 | 5 | 3.5 |
| Strain at Break | % |  |  |  |  |
| MD |  | 800 | 500 | 340 | 250 |
| TD |  | 280 | 250 | 150 | 200 |
| Modulus | Mpa |  |  |  |  |
| MD |  | 120 | 110 | 120 | 40 |
| TD |  | 145 | 120 | 130 | 50 |
| Energy to Break | MJ/cu. M |  |  |  |  |
| MD |  | 60 | 40 | 20 | 8 |
| TD |  | 20 | 16 | 10 | 7.5 |

Example 5

The blend of this example was produced by the procedure of Example 2, except that 90 parts of the PEO pellets of Example 1 were blended with 10 parts of HYCAR® 1580 (BF Goodrich) acrylonitrile-styrene butadiene (ASB) rubber emulsion (total solids-46 wt %). A film was produced from the pellets of this blend following the procedure of Example 1. The film had a thickness of about 2 mil and HYCAR® emulsion content of about 10% by weight. The tensile and tear properties of this film are provided in Table 2. During tear testing, this film experienced Failure by Tear in the machine direction and Tensile Failure in the transverse direction.

Example 6

The blend of this example was produced by the procedure of Example 2, except that 70 parts of the PEO pellets were blended with 30 parts of HYCAR® 1580 (BF Goodrich) acrylonitrile styrene butadiene emulsion. A film was produced from this blend following the procedure of Example 1. The film had a thickness of about 2.5 mil and a HYCAR® emulsion content of about 30% by weight. The tensile and tear properties of this film are provided in Table 2. During tear testing, this film experienced Tensile Failure in both the machine and transverse directions.

Example 7

350 parts of POLYOX® WSR N3000 (PEO) resin in powder form (Union Carbide Corp.) were mixed with 48 parts of Tween® 20 (ICI Americas Inc.) and 2 parts of Irganox® 1076 (Ciba Specialty Chemicals Corp.) using a ribbon blender. Then the powder was coated with 100 parts of Good Rites SB 1168 styrene butadiene emulsion (BF Goodrich) using a high pressure spray gun, while the powder was still being mixed in the ribbon blender. The coated powder was then fed into a twin screw extruder available at Planet Polymer Technologies (San Diego, Calif.). The feed zone temperature was 180° F.; the barrel zone was 250–300° F.; the adapter was 300–320° F.; and the die temperature was 320° F. The screw speed was 250 rpm, and the feeding rate was 85–100 rpm. The melt strands were cooled by air on a conveyor belt and pelletized. The use of higher processing temperatures at Planet Polymer Technologies compared to the processing temperatures used with the lab-scale Haake extruder resulted in more intensive evaporation of volatiles, including water. The processing conditions, however, were optimized to obtain solid, uniform strands of the blend which were pelletized using an air cooled conveyor belt. These pellets were then cast into a film using the procedure of Example 1. The film had a thickness of about 5 mil. The tensile and tear properties of this film are provided in Table 2. During tear testing, this film experienced Tensile Failure in both the machine and transverse directions.

Example 8

The blend of this example was produced by the procedure of Example 7, except that 117 parts of POLYOX® WSR N3000 polyethylene oxide resin in powder form were mixed with 32 parts Tween® 20, 1 part of Irganox® 1076, and 50 parts of Good Rite® SB 1168 styrene butadiene emulsion to produce the blend pellets. These pellets were converted into a film following the procedure of Example 1. The film had a thickness of about 2.5 mil. The tensile and tear properties of this film are provided in Table 2. During tear testing, this film experienced Failure by Tear in the machine direction and Tensile Failure in the transverse direction.

TABLE 2

|  | Units | Ex. #5 | Ex. #6 | Ex. #7 | Ex. #8 |
|---|---|---|---|---|---|
| Tear Test Results |  |  |  |  |  |
| Maximum Load | g/sq. mm |  |  |  |  |
| MD |  | 270 | 265 | 270 | 215 |
| TD |  | 190 | 210 | 250 | 240 |
| Energy to Peak Load | MJ/cu. M |  |  |  |  |
| MD |  | 4 | 3 | 30 | 6.5 |
| TD |  | 4 | 20 | 10 | 25 |
| Total Energy | MJ/cu. M |  |  |  |  |
| MD |  | 9 | 40 | 40 | 8 |
| TD |  | 7 | 25 | 15 | 30 |
| Tensile Test Results |  |  |  |  |  |
| Tensile Strength | Mpa |  |  |  |  |
| MD |  | 10 | 8 | 7 | 12 |
| TD |  | 7 | 6 | 7 | 5 |
| Strain at Break |  |  |  |  |  |
| MD |  | 870 | 1050 | 1150 | 1150 |
| TD |  | 380 | 630 | 730 | 650 |
| Modulus | Mpa |  |  |  |  |
| MD |  | 120 | 90 | 100 | 55 |
| TD |  | 120 | 100 | 115 | 65 |
| Energy to Break | MJ/cu. M |  |  |  |  |
| MD |  | 80 | 70 | 70 | 100 |
| TD |  | 25 | 35 | 50 | 35 |

Example 9

The blend of this example was produced by the procedure of Example 7, except that 121 parts POLYOX® WSR N750 polyethylene oxide resin in powder form were mixed with 28 parts of Tween® 20, 1 part of Irganox® 1076, and 50 parts of Good Rite® SB 1168 styrene butadiene emulsion to produce the blend pellets. These pellets were converted into a film following the procedure of Example 1. The film had a thickness of about 2.5 mil. The tensile and tear properties of this film are provided found in Table 3. During tear testing, this film experienced Failure by Tear in the machine direction and Tensile Failure in the transverse direction.

Example 10

The blend of this example was produced by the procedure of Example 7, except that 105 parts of POLYOX® WSR N750 (PEO) resin in powder form were mixed with 44 parts of Tween® 20, 1 part of Irganox® 1076, and 50 parts of Good Rite® SB 1168 styrene butadiene emulsion to produce the blend pellets. These pellets were converted into a film following the procedure of Example 1. The film had a thickness of about 2.5 mil. Due to the higher plasticizer content in this film, some of the Tween 20 bled out onto the surface of the film. The tensile and tear properties of film are provided in Table 3. During tear testing, this film experienced Failure by Tear in the machine direction and Tensile Failure in the transverse direction.

TABLE 3

| | Units | Ex. #9 | Ex. #10 |
|---|---|---|---|
| Tear Test Results | | | |
| Maximum Load | g/sq. mm | | |
| MD | | 220 | 190 |
| TD | | 220 | 165 |
| Energy to Peak Load | MJ/cu. M | | |
| MD | | 4 | 4 |
| TD | | 25 | 30 |
| Total Energy | MJ/cu. M | | |
| MD | | 5 | 6 |
| TD | | 30 | 40 |
| Tensile Test Results | | | |
| Tensile Strength | Mpa | | |
| MD | | 12 | 12 |
| TD | | 6 | 4 |
| Strain at Break | % | | |
| MD | | 1250 | 1750 |
| TD | | 1025 | 1400 |
| Modulus | Mpa | | |
| MD | | 50 | 35 |
| TD | | 60 | 30 |
| Energy to Break | MJ/cu. M | | |
| MD | | 105 | 140 |
| TD | | 55 | 50 |

Example 11
Breathability

The water vapor transmission rate (WVTR) values for the films of Example 1 and Example 9 were calculated in accordance with ASTM Standard E96-80. Circular samples measuring three inches in diameter were cut from each of the test materials and a control, CELGARD® 2500 microporous film which is available from Hoechst Celanese Corporation. The individual samples of the test materials and control material were placed across the open tops of individual vapometer cups containing one hundred milliliters of distilled water. The screw-on flanges were tightened to form a seal along the edges of the cup. The cups were placed in a convection type oven at 100° F. The relative humidity within the oven was not specifically controlled. The caps were weighed and immediately placed into oven. After 24 hours, the cups were removed from the oven and weighed again. The WVTR of each material was calculated based on the weight loss and WVTR of the control film, assuming the WVTR of the CELGARD® 2500 microporous film to be 5000 g/m$^2$/24 hr under predetermined set conditions. The breathability of the film (WVTR) produced in Example 1 was 2000 g/m$^2$/24 hr, while that of the film produced in Example 9 was 1750 g/m$^2$/24 hr.

Example 12

The melt rheology of polyethylene oxide, PEO N-3000, and several blends comprising PEO and latex was measured using a Gottfert Rheograph 2003 capillary rheometer with WinRHEO version 2.31 analysis software. A 2000 bar pressure transducer was employed with the 30/1.0/180 roundhole capillary die. The melt viscosity in Pa sec was measured at various shear rates of 50, 100, 200, and 1000 rpm and temperatures of 125° C. and 175° C.

The results at 125° C. are presented in Table 4 and the results at 175° C. are presented in Table 5.

TABLE 4

| Shear Rate (1/s) | PEO N3000 [Pa sec] | PEO N3000/ SBL-1168 (70/30) | PEO N3000/ Hycar-1580 (70/30) | PEO N3000/ Hycar-1580 (90/10) |
|---|---|---|---|---|
| 50 | 3794 | 2573 | 2540 | 3387 |
| 100 | 2394 | 1653 | 1775 | 2182 |
| 200 | 1563 | 1046 | 1128 | 1348 |
| 500 | 819 | 558 | 596 | 731 |
| 1000 | 453 | 335 | 351 | 417 |

TABLE 5

| Shear Rate (1/s) | PEO N3000 [Pa sec] | PEO N3000/ SBL-1168 (70/30) | PEO N3000/ Hycar-1580 (70/30) | PEO N3000/ Hycar-1580 (90/10) |
|---|---|---|---|---|
| 50 | 3257 | 2182 | 3697 | 1905 |
| 100 | 2190 | 1417 | 3102 | 1360 |
| 200 | 1368 | 908 | 1844 | 843 |
| 500 | 704 | 490 | 933 | 484 |
| 1000 | 440 | 300 | | 311 |

Example 13

A thermal analysis of several PEO blends was performed using a Thermal Analyst (TA) 2910 Differential Scanning Calorimeter (DSC) with TA Analyst 2200. All testing was performed under a N$_2$ atmosphere. The results were evaluated using the DSC4.0 analysis program, and the melting temperature (T$_m$) was quantified and presented in Table 6.

TABLE 6

| Composition | Melting Temperature ° Celsius |
|---|---|
| PEO N3000/plasticizer 12% | 66 |
| PEO N3000/SBR 20% plasticizer 9.6% | 71 |
| PEO N750/SBR 25% plasticizer 14% | 65 |
| PEO N3000/ABS 1580 10% plasticizer 10.8% | 64 |

Example 14

Thin cross-sections of an extrudate of each of the blends from Examples 2, 3, and 4 were prepared by cryo-microtomy using a Reichert UltraCut S FCS cryo-ultramicrotome equipped with a Diatome diamond cryoknife. Cryo-temperature sectioning was performed to stiffen the polymers enough to avoid smearing.

Toughened PEO/latex blend spherulite size analysis was performed using polarized light optical microscopy. For polarized light microscopy, sections three micrometers thick were cut at a sample temperature of −80° C. and a knife temperature of −80° C. In the case of the large diameter extrudate, the specimen was trimmed to a block face size of about 1 mm². To minimize severe curling of the section that occurred during cutting, a sectioning speed of 0.2 mm/sec was used. Curling required that the sections be guided off of the knife edge with an eyelash probe and then delicately unrolled and flattened onto the glass examination slide. Care was taken to avoid damage to the section during this process, as they were quite soft and somewhat self-sticky.

After the sections were flattened on the slide surface, they were mounted using Resolve® non-drying medium and coverslipped. They were examined using crossed or partially crossed polarizer in an Olympus BH-2 microscope. Polaroid® photomicrographs were taken at fixed magnifications of 75×, and 155×.

Figure 4:
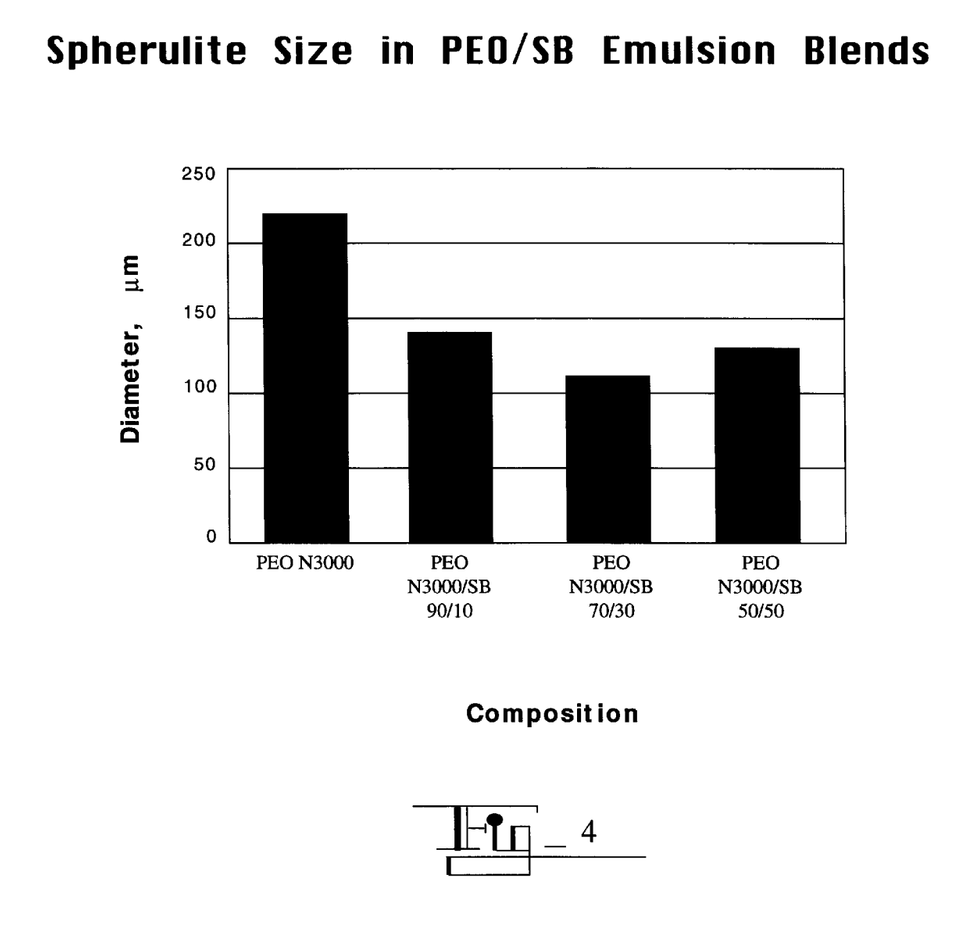
FIG. 4 illustrates the reduction in spherulite size by the addition of latex particles to the PEO resin.

Spherulite size measurement was performed by scanning the polarized light photomicrographs into the PC based image analysis program, ImageTool V1.25, (available via Internet, free from the University of Texas Health Science Center, San Antonio). Measurement calibration was made using a stage micrometer (Graticules, Ltd., Kent, U.K.) based on 10 micron divisions. Twenty spherulites per sample were measured and the results were tabulated in a spreadsheet, from which the average spherulite size was determined. (See FIG. 4)

Example 15

Surface images of the blend of Example 2 were acquired using a Model E-2020 Environmental Secondary Electron Microscope (ESEM) (ElectroScan Corp., Wilmington, Mass.). The images were acquired in tagged file image format (TIFF) and were 1024×1024 pixels resolution. Images also possessed a micron bar (10 or 25 μm) for calibration purposes. (See FIG. 2)

Figure 1:
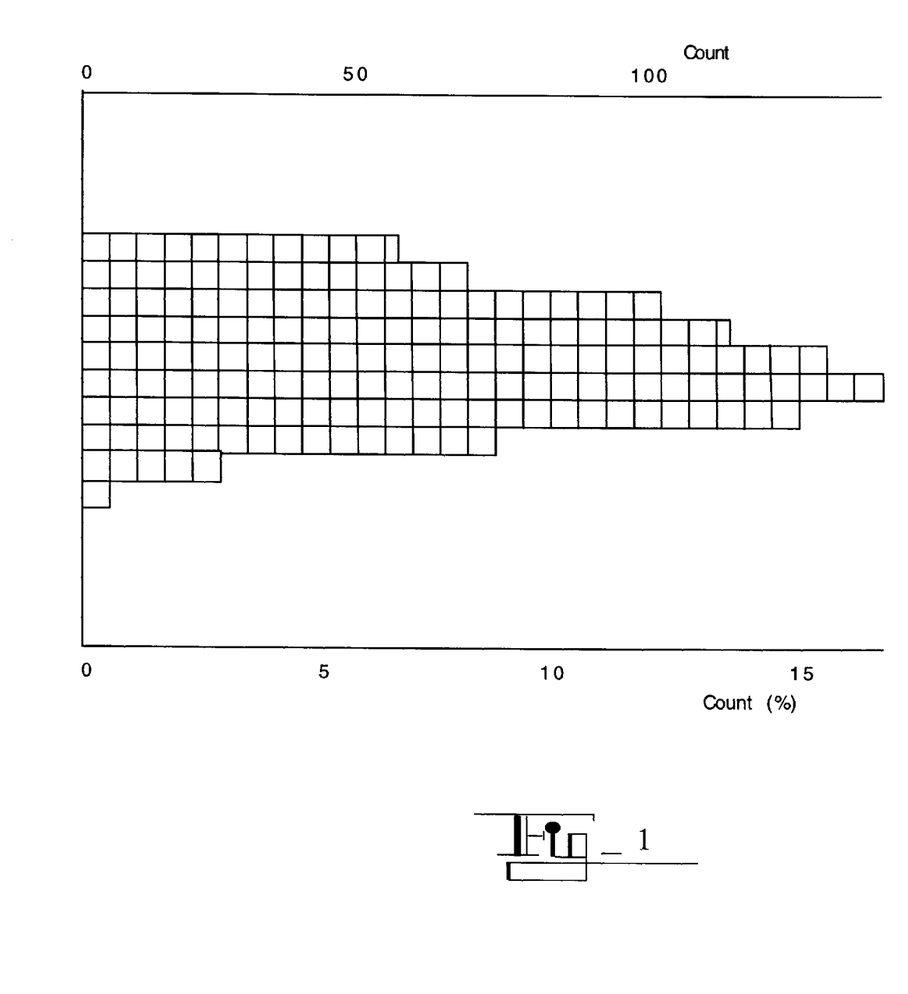
FIG. 1 demonstrates the rubber particle size distribution in the PEO/latex (90/10) blend.

After the images were acquired, they were transferred to a Quantimet 600 IA System (Leica, Inc., Deerfield, Ill.). An image analysis program was written using QUIPS operating software present in the Quantimet 600. This program performed the following functions: acquired the image, performed a calibration, detected latex particles, performed image processing, measured percentage of area covered and particle size, and output data, such as mean values, statistics, a size distribution histogram, and the image. (See FIG. 1) Particle sizes were measured using an equivalent-circular diameter (ECD) derived parameter:

$$ECD = (4 \times Area/\pi)^{1/2}$$

The % Area Covered by latex particles=14.25
Particle Count via ECD is as follows:

| Bin | ECD (μm) | Count | Count (%) |
|---|---|---|---|
| 1 | | | |
| 2 | 0.010–0.014 | 0 | 0.00 |
| 3 | 0.014–0.020 | 0 | 0.00 |
| 4 | 0.020–0.026 | 0 | 0.00 |
| 5 | 0.028–0.040 | 0 | 0.00 |
| 6 | 0.040–0.056 | 0 | 0.00 |
| 7 | 0.056–0.079 | 0 | 0.00 |
| 8 | 0.079–0.112 | 68 | 6.67 |
| 9 | 0.112–0.158 | 70 | 8.06 |
| 10 | 0.158–0.224 | 105 | 12.07 |
| 11 | 0.224–0.316 | 118 | 13.56 |
| 12 | 10.316–0.447 | 136 | 16.83 |
| 13 | 0.447–0.631 | 145 | 16.67 |
| 14 | 0.631–0.891 | 131 | 15.06 |
| 15 | 0.89–1.26 | 76 | 6.74 |
| 16 | 1.25–1.78 | 26 | 2.99 |
| 17 | 1.78–2.51 | 4 | 0.46 |
| 18 | 2.51–3.65 | 1 | 0.11 |
| 19 | 3.55–5.01 | 0 | 0.00 |
| 20 | 6.01–7.08 | 0 | 0.00 |
| 21 | 7.08–10.0 | 0 | 0.00 |
| Total | | 420.58 | # of particles |
| Mean | | 0.48 μm | |
| Std Dev | | 0.34 μm | |
| Std Error | | 0.01 | |
| Max | | 2.85 μm | |
| Min | | 0.11 μm | |

Example 16

The atomic force microscopy image of the blend of Example 3 was obtained by using the SPM, Nanoscope® IIIa Multimode™ (Digital Instruments, Santa Barbara, Calif.), a scanning probe microscope, by using Tapping Mode with phase imaging. An optical microscope combined with the Nanoscope was used for positioning the probe on the cross section of the blend. For atomic force microscopy, the cross-sections of extrudate of the PEO/latex blends were prepared by cryo-microtomy using a Reichert UltraCut S FCS cryo-ultramicrotome equipped with a Diatome diamond cryoknife. Cryo temperature sectioning was required to stiffen the polymers enough to avoid smearing. Block cross sections were prepared at a sample temperature of −80° C., and the knife temperature was also set to −80° C. In the case of the large diameter extrudate, the specimen was trimmed to a block face size of about 1 mm². A dispersion of latex particles in lamellae structure of the PEO/latex blends was analyzed using atomic force microscopy technique. (See FIG. 3)

The above examples are intended to be demonstrative, rather than limiting, of the embodiments contemplated by the invention and encompassed within the scope of the claims.

What is claimed is:

1. A melt-extruded blend comprising:
   a water-soluble or water-dispersible polymer;
   modifier particles dispersed throughout the water-soluble or water-dispersible polymer, wherein the modifier particles comprise polybutadiene, styrene butadiene polymers, acrylics, styrene acrylics, polyvinyl acetate, acrylonitrile-butadiene-styrene polymers, acrylonitrile, acrylonitrile butadiene polymers, or a mixture thereof; and bound water.

2. The melt-extruded blend of claim 1, wherein the water-soluble or water-dispersible polymer comprises polyethylene oxide, hydroxypropyl cellulose, polyvinyl alcohol, polyethyloxazoline, polyvinyl pyrrolidone, polyvinyl pyridine, gelatinized starch, nylon copolymers, polyacrylic acid, polyesters or mixtures thereof.

3. The melt-extruded blend of claim 2, wherein the water-soluble or water-dispersible polymer comprises polyethylene oxide.

4. The melt-extruded blend of claim 1, wherein the modifier particles comprise from about 3 wt % to about 30 wt % based on the weight of the water-soluble or water-dispersible polymer.

5. The melt-extruded blend of claim 4, wherein the modifier particles comprise from about 8 wt % to about 20 wt % based on the weight of the water-soluble or water-dispersible polymer.

6. The melt-extruded blend of claim 1, wherein the modifier particles have an average particle size of from about 10 nanometers to about 20 microns.

7. The melt-extruded blend of claim 6, wherein the modifier particles have an average particle size of from about 100 nanometers to about 5 microns.

8. The melt-extruded blend of claim 1, wherein the melt-extruded blend is a film or fiber.

9. The melt-extruded blend of claim 1, wherein the melt-extruded blend is a film having a thickness of from about 1 mil to about 4 mil.

10. The melt-extruded blend of claim 1, wherein the melt-extruded blend is a film having an elongation-at-break in the machine direction of from about 150% to about 1000%, and an elongation-at-break in the transverse direction of from about 100% to about 1000%.

11. The melt-extruded blend of claim 1, wherein the melt-extruded blend is an unstretched film having a water vapor transmission rate of from about 800 g/m$^2$/24 hr/mil to about 7,000 g/m$^2$/24 hr/mil.

12. A melt-extruded blend comprising:

polyethylene oxide;

modifier particles dispersed throughout the polyethylene oxide; and bound water hydrogen bonded to oxygen atoms of the polyethylene oxide;

wherein the modifier particles comprise styrene butadiene polymers, acrylonitrile-butadiene-styrene polymers, or a mixture thereof.

13. The melt-extruded blend of claim 12, wherein the modifier particles comprise from about 3 wt % to about 30 wt % based on the weight of the polyethylene oxide.

14. The melt-extruded blend of claim 12, wherein the modifier particles have an average particle size of from about 100 nanometers to about 5 microns.

15. The melt-extruded blend of claim 12, wherein the melt-extruded blend is a film having an elongation-at-break in the machine direction of from about 150% to about 1000%, and an elongation-at-break in the transverse direction of from about 100% to about 1000%.

16. The melt-extruded blend of claim 12, wherein the melt-extruded blend is an unstretched film having a water vapor transmission rate of from about 800 g/m$^2$/24 hr/mil to about 7,000 g/m$^2$/24 hr/mil.

17. A melt-extruded blend comprising:

polyethylene oxide;

modifier particles dispersed throughout the polyethylene oxide; and bound water hydrogen bonded to oxygen atoms of the polyethylene oxide;

wherein the modifier particles comprise styrene butadiene polymers, acrylonitrile-butadiene-styrene polymers, or a mixture thereof; wherein the melt-extruded blend is a film having an elongation-at-break in the machine direction of from about 150% to about 1000%, an elongation-at-break in the transverse direction of from about 100% to about 1000%; and a water vapor transmission rate of from about 800 g/m$^2$/24 hr/mil to about 7,000 g/m$^2$/24 hr/mil when in an unstretched condition.

* * * * *